US006944301B1

(12) United States Patent
Nohrden et al.

(10) Patent No.: US 6,944,301 B1
(45) Date of Patent: Sep. 13, 2005

(54) METHOD AND APPARATUS FOR DISCRIMINATING MULTIPATH AND PULSE NOISE DISTORTIONS IN RADIO RECEIVERS

(75) Inventors: James M. Nohrden, Austin, TX (US); Brian D. Green, Austin, TX (US); Brian P. Lum Shue Chan, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/265,659

(22) Filed: Mar. 10, 1999

(51) Int. Cl.[7] ......................... H04H 5/00; H04B 17/00; H04B 1/00; H04B 1/10

(52) U.S. Cl. .................. 381/13; 455/67.11; 455/67.13; 455/63.1; 455/226.1; 375/346; 375/350

(58) Field of Search ....................... 381/13; 455/67.11, 455/63.1, 226.1, 67.13; 375/346, 350

(56) References Cited

U.S. PATENT DOCUMENTS

| | | | | |
|---|---|---|---|---|
| 3,939,426 | A | | 2/1976 | Traub et al. |
| 4,006,419 | A | | 2/1977 | Liman |
| 4,063,039 | A | | 12/1977 | Endres et al. |
| 4,066,845 | A | | 1/1978 | Kishi |
| 4,390,749 | A | | 6/1983 | Pearson |
| 4,416,024 | A | | 11/1983 | Ugari et al. |
| 4,457,012 | A | | 6/1984 | Carver |
| 4,817,151 | A | | 3/1989 | Bod et al. |
| 5,249,233 | A | | 9/1993 | Kennedy et al. |
| 5,408,685 | A | * | 4/1995 | Kennedy et al. .............. 455/65 |
| 5,432,854 | A | | 7/1995 | Honjo et al. |
| 5,671,286 | A | | 9/1997 | Gottfried et al. |
| 5,710,995 | A | | 1/1998 | Akaiwa et al. |
| 5,832,043 | A | * | 11/1998 | Eory .......................... 375/344 |
| 6,118,990 | A | * | 9/2000 | Matsumoto .............. 455/277.1 |

* cited by examiner

*Primary Examiner*—Xu Mei
*Assistant Examiner*—Devona E Faulk
(74) *Attorney, Agent, or Firm*—Steven Lin, Esq.

(57) ABSTRACT

Distortion discrimination circuitry for digital radio receivers and corresponding methods are disclosed that accurately and efficiently discriminate distortion events, including impulse noise and multipath distortion events, to improve the quality of audio output signals. The distortion discrimination circuitry monitors and analyzes the demodulator output to determine when a distortion event has occurred and provides an appropriate indication signal for use by other circuitry within the radio receiver. More particularly, the distortion discrimination circuitry includes impulse noise circuitry that looks for high frequency noise in both the magnitude and multiplexed outputs of the demodulator to determine the occurrence of impulse noise distortion events. The distortion discrimination circuitry also includes multipath circuitry that looks for a drop-off in signal power between the multiplexed output of the demodulator and a moving average version of that same signal to determine the occurrence of multipath distortion events. In addition, stereo decoder circuitry modifies the audio output signals in response to indications of distortion events.

26 Claims, 7 Drawing Sheets

METHOD AND APPARATUS FOR DISCRIMINATING MULTIPATH AND PULSE NOISE DISTORTIONS IN RADIO RECEIVERS

This application is related to the following U.S. patent applications that have been filed concurrently herewith and that are hereby incorporated by reference in their entirety: Ser. No. 09/265,663 filed Mar. 10, 1999, entitled "Method and Apparatus for Demodulation of Radio Data Signals" by Eric J. King and Brian D. Green; Ser. No. 09/266,418 filed Mar. 10, 1999, entitled "Station Scan Method and Apparatus for Radio Receivers" by James M. Nohrden and Brian P. Lum Shue Chan, which has issued as U.S. Pat. No. 6,389,270; Ser. No. 09/265,752, entitled "Digital Stereo Recovery Circuitry and Method For Radio Receivers" by Brian D. Green, which has issued as U.S. Pat. No. 6,694,026; Ser. No. 09/414,209, entitled "Quadrature Sampling Architecture and Method For Analog-To-Digital Converters" by Brian P. Lum Shue Chan, Brian D. Green and Donald A. Kerth, which has issued as U.S. Pat. No. 6,650,264; and Ser. No. 09/265,758, entitled "Complex Bandpass Modulator and Method for Analog-to-Digital Converters" by Brian D. Green, which has issued as U.S. Pat. No. 6,225,928.

BACKGROUND OF THE INVENTION

1. Field of the Invention

The present invention relates generally to noise distortion discrimination circuitry for radio receivers. More specifically, the present invention relates to techniques for discriminating multipath and pulse noise distortions in a digital radio receiver for an automobile.

2. Description of the Related Art

At any given time, radio receivers may receive radio signals transmitted by numerous different stations. Radio receivers typically tune to the radio signals transmitted by a particular station and convert these radio signals into program information. The signals transmitted by stations may include AM audio signals, FM audio signals, and data information. With respect to audio information, radio receivers typically attempt to provide a high quality reproduction of the audio information transmitted by the selected station. In attempting to produce these high quality audio output signals, the radio receiver may to experience various events that can cause distortions in the audio signals being received, processed, and output by a radio receiver. These events include impulse noise distortions and multipath distortions.

Impulse noise distortions are distortion events that evidence themselves as brief periods of unstable amplitude and frequency spikes within the audio signal. For example, with an automobile radio receiver, impulse noise distortions often arise due to ignition of the automobile and due to turning on and off electrical components, such as for example windshield wipers, power windows, cigarette lighter, etc. Any of these activities may cause an electrical impulse that will create transient impulses at the antenna input or within the radio receiver circuitry. In addition, when using prior art circuitry for FM broadcast, data information, which typically resides at frequencies above audio signal information, may be incorrectly interpreted as impulse noise. Thus, if not properly discriminated, impulse noise distortions or falsely determined impulse noise distortions may significantly degrade audio performance.

Multipath distortions are distortion events that evidence themselves as brief periods of significantly reduced signal power. Multipath distortions typically occur when the signal power of a transmitted signal received at an antenna of the radio receiver is reduced by an out-of-phase version of the same transmitted signal that has traveled to the antenna along a different path. Multipath distortions may occur whether the radio receiver is stationary or mobile. If the transmitted signal reaches the receiver along two different paths such that one signal is out-of-phase with respect to the other, multipath distortions may occur. For a moving receiver, for example one positioned within a moving automobile, the movement of the automobile may also cause time-varying or intermittent out-of-phase signals to be received by the antenna. If not discriminated, multipath distortions may also significantly degrade audio performance.

SUMMARY OF THE INVENTION

In accordance with the present invention, distortion discrimination circuitry accurately and efficiently discriminates distortion events, including impulse noise and multipath distortion events, to improve the quality of audio output signals provided by radio receivers. In one embodiment, the distortion discrimination circuitry monitors and analyzes the demodulator output to determine when a distortion event has occurred and provides an appropriate indication signal for use by other circuitry within the radio receiver. In more particular embodiments, the distortion discrimination circuitry may include impulse noise circuitry that looks for high frequency noise in both the magnitude and multiplexed outputs of the demodulator to determine the occurrence of impulse noise distortion events. Furthermore, the distortion discrimination circuitry may include multipath circuitry that looks for a drop-off in signal power between the multiplexed output of the demodulator and a low-pass filtered version of that same signal to determine the occurrence of multipath distortion events. In addition, stereo decoder circuitry may modify the audio output signals in response to indications of distortion events.

DESCRIPTION OF THE PREFERRED EMBODIMENTS

Figure 1:
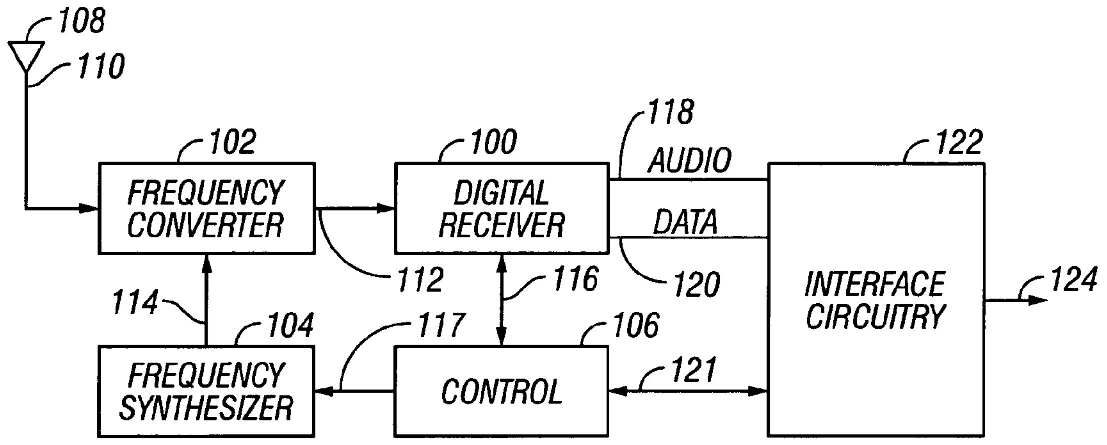
FIG. 1 is a block diagram of an embodiment for an intermediate frequency (IF) AM/FM radio receiver.

Referring now to FIG. 1, a block diagram is depicted of an embodiment for an intermediate frequency (IF) AM/FM radio receiver 150. A frequency converter circuitry 102 converts a radio frequency (RF) signal 110 received at the antenna 108 to an IF frequency 112. The frequency converter circuitry 102 utilizes a mixing signal 114 from a frequency synthesizer 104 to perform this conversion from the RF frequency range to the IF frequency range. Control circuitry 106 may apply a control signal 117 to frequency synthesizer 104 to choose the mixing signal 114 depending upon the station or channel that is desired to be received by the IF receiver 150. The digital receiver circuitry 100 processes the IF signal 112 and produces desired output signals, for example, audio output signals 118 and data output signals 120, which may be for example radio data signal (RDS) information or some other data information. These output signals may be provided to interface circuitry 122 and output to external devices through interface signals 124. The control circuitry 106 may communicate with the digital receiver circuitry 100 through signals 116 and may communicate with the interface circuitry 122 through signals 121. In addition, control circuitry 106 may communicate with external devices through the interface circuitry 122.

Figure 2:
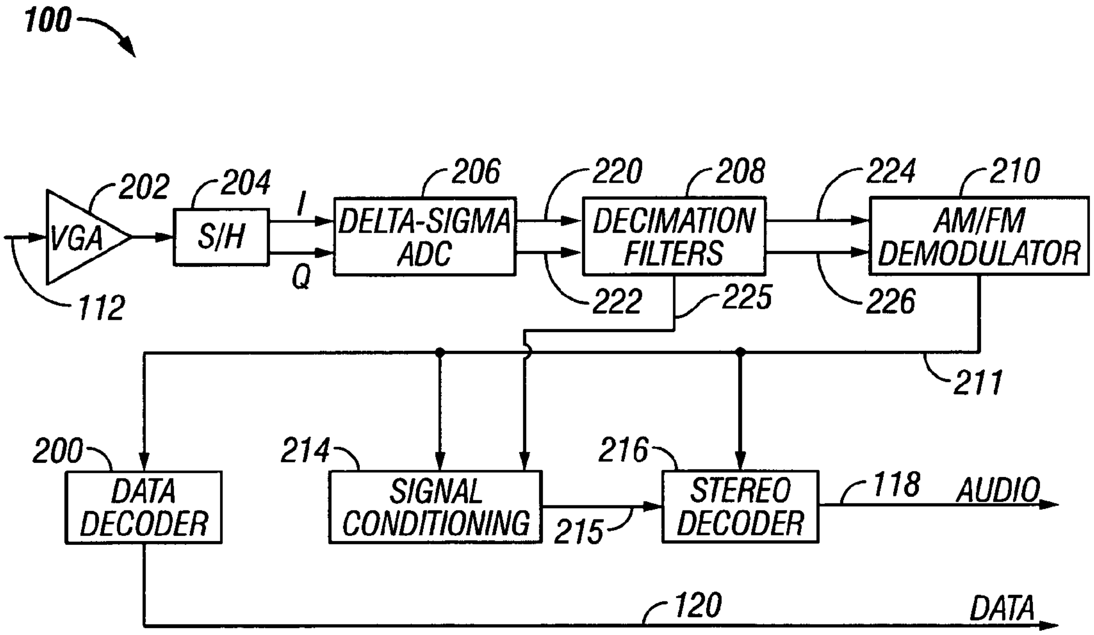
FIG. 2 is a block diagram of an embodiment for the digital receiver within the IF AM/FM radio receiver.

FIG. 2 is a block diagram of an embodiment for the digital receiver 100. The IF input signal 112 is amplified by a variable gain amplifier (VGA) 202. The output of the variable gain amplifier (VGA) 202 may be filtered with anti-aliasing filters if desired. Sample-and-hold (S/H) circuitry 204 samples the resulting signal and produces a real or in-phase (I) output signal and an imaginary or quadrature (Q) output signal. The Q signal is related to the signal by being 90 degrees out of phase with respect to the I signal. The analog-to-digital converter (ADC) circuitry 206 processes the I and Q signals to form an I digital signal 220 and a Q digital signal 222. The ADC circuitry 206 may be for example two fifth order low-pass delta-sigma ADCs that operate to convert the I and Q signals to one-bit digital I and Q data streams 220 and 222. The digital output signals 220 and 222 of the ADC circuitry 206 are passed through digital decimation filters 208 to complete channelization of the signals and to produce decimated I data signal 224 and Q data signal 226. The decimation filters 208 may also remove quantization noise caused by ADC 206 and provide some anti-aliasing filtering.

Demodulation of the decimated I and Q data signals may be performed by AM/FM demodulator 210. The demodulator 210 may include for example a CORDIC (COordinated Rotation DIgital Computer) processor that processes the digital I and Q data streams 224 and 226 and outputs both angle and magnitude data for of the I and Q digital data signals. For FM demodulation, the demodulator 210 may also perform discrete-time differentiation on the angle value outputs. The demodulated signal 211 may be further processed by signal conditioning circuitry 214, which may also receive signal 225 from the decimation filter circuitry 208. The signal conditioning circuitry 214 may provide any desired signal processing, including for example detecting weak signal conditions, multi-path distortions and impulse noise distortions as well as making appropriate modifications to the signals to compensate for these signal problems.

The stereo decoder 216 processes the demodulated signal 211, for example to decode the left and right channel information from a multiplexed FM stereo signal, and produces the desired audio output signals 118. The signal conditioning circuitry 214 provides signals 215 to the stereo decoder 216 to control the output of the stereo decoder depending upon the processing performed by the signal conditioning circuitry 214. The stereo decoder 216 may also provide additional signal processing as desired. The demodulated signal 211 may also be processed by an data decoder 212 to recover data from the multiplex (mpx) signal 211 using for example a synchronous digital demodulator. The output of the data decoder 212 provides the desired data output signals 120, which may include clock and data signal information.

Figure 4:
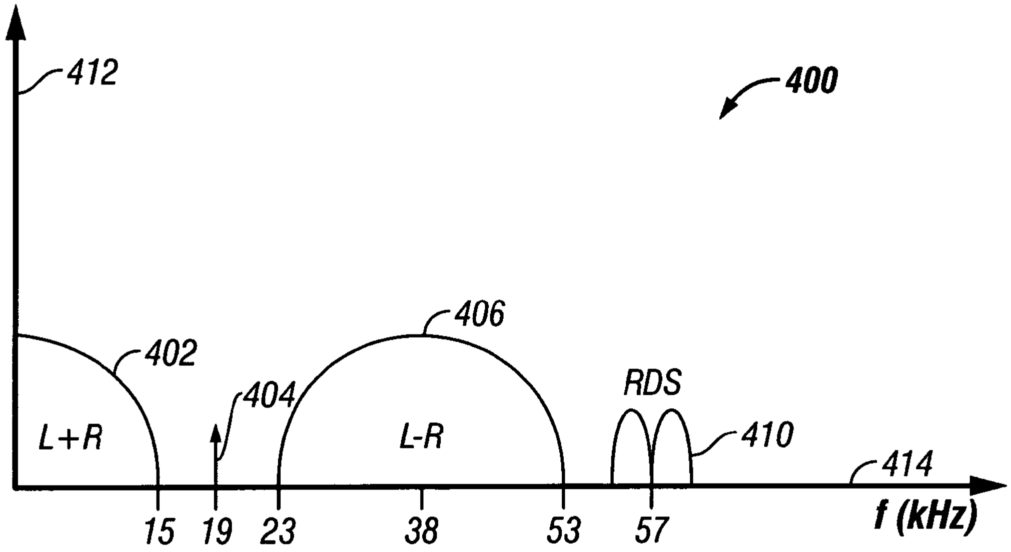
FIG. 4. is a graphical representation of a signal frequency spectrum for a demodulated FM radio frequency (RF) signal.

FIG. 4 is a graphical representation of an example signal frequency spectrum 400 of demodulated FM signal 211 from the AM/FM demodulator 210. The y-axis 412 represents the magnitude of the signal 211, and the x-axis 414 represents the frequency of the signal 211. Stereo signal information typically resides in two different frequency bands. The first stereo signal information is the left-plus-right (L+R) signal 402 that resides in the region from 0–15 kHz (looking to positive frequencies only). The second stereo signal information is the left-minus-right (L–R) signal 406 that resides in the region from 23–53 kHz. A 19 kHz pilot signal 404 is also included within the demodulated signal 211, which may be recovered from the demodulated signal 211 and used to move the L-R signal 406 to baseband. In addition to these signals, the demodulated signal 211 may include data information, such as a data signal 410, which may be two signal lobes on either side of 57 kHz. The pilot signal 404 may also be used to move this data signal 410 to baseband.

Figure 3:
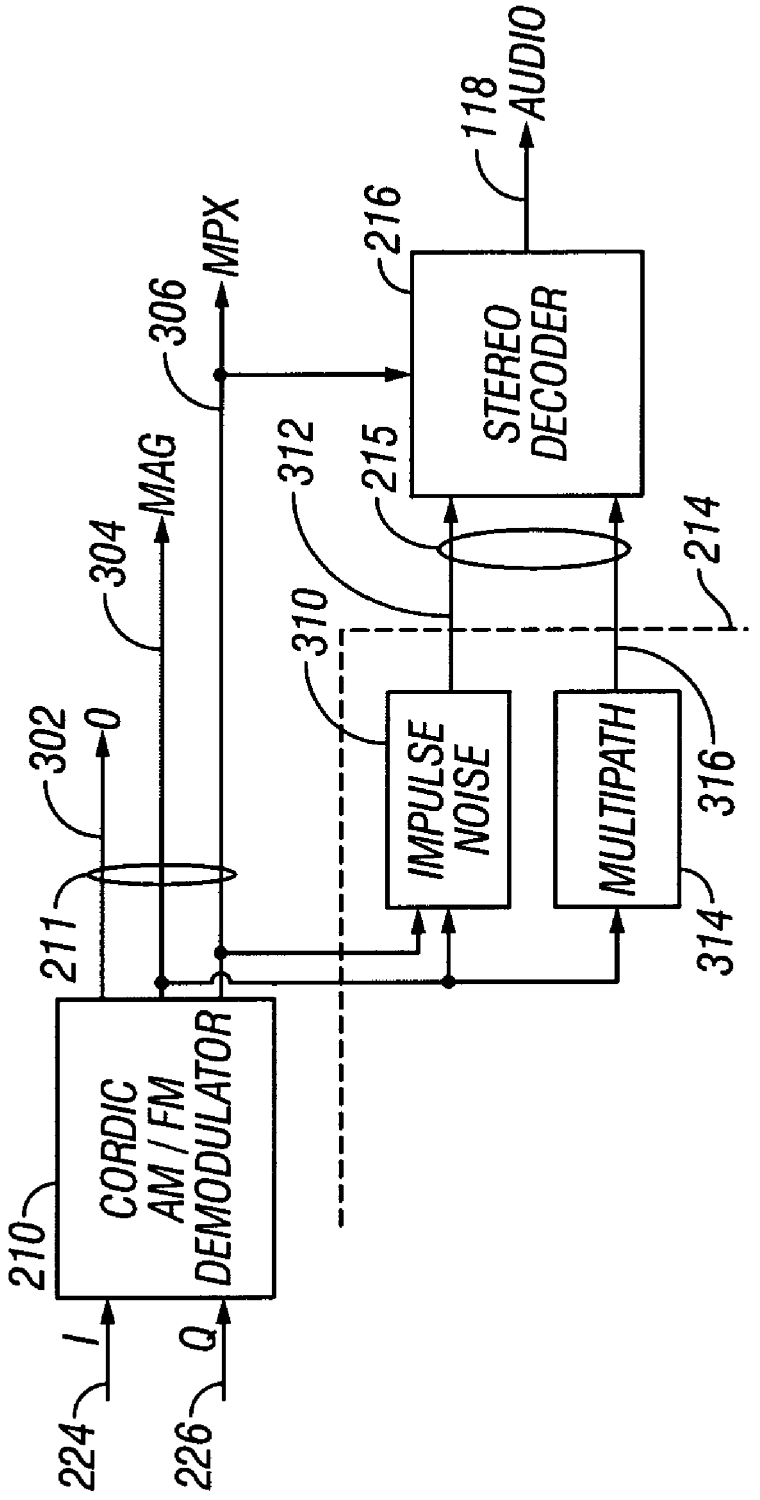
FIG. 3 is a block diagram depicting distortion discrimination circuitry, including impulse noise distortion discrimination circuitry and multipath distortion discrimination circuitry, according to the present invention.

FIG. 3 is a block diagram depicting impulse noise distortion processing circuitry 310 and multipath distortion processing circuitry 314 within the signal conditioning circuitry 214. The AM/FM demodulator 210 may be a CORDIC processor that takes the digital I and Q data streams 224 and 226 and produces demodulated signal 211 as an output. For the CORDIC AM/FM demodulator 210, the demodulated signal 211 includes a phase angle signal (ϕ) 302, a magnitude signal (mag) 304, and a multiplexed signal (mpx) 306. The multiplexed signal (mpx) 306 is the result of discrete-time differentiation performed upon the phase output 302 of the CORDIC AM/FM demodulator 210. The stereo decoder 216 processes the multiplexed signal (mpx) 306 to produce the desired audio output signals (AUDIO) 118, and the data decoder 200 processes the multiplexed signal (mpx) 306 to produce the desired data output signals 120.

As contemplated by the present invention, the multiplexed signal (mpx) 306 and the magnitude signal (mag) 304 may be analyzed to discriminate distortion events within the received signal. In the embodiment depicted, the impulse noise circuitry 310 analyzes the magnitude signal (mag) 304 and the multiplexed signal (mpx) 306 to determine if impulse noise distortions exist within the signal. If this determination concludes that impulse noise distortions do exist, the impulse noise circuitry 310 produces an appropriate indication through blank signal (BLANK) 312. Similarly, in the embodiment depicted, the multipath circuitry 314 analyzes the magnitude signal (mag) 304 to determine if multipath distortions exist within the signal. If this determination concludes that multipath distortions do exist, the multipath circuitry 314 produces an appropriate indication through the switch signal (SWITCH) 316. Depending upon the distortion conditions indicated by the indication signals 215, which may include the blank signal (BLANK) 312 and the switch signal (SWITCH) 316, the stereo decoder 216 may modify the output signal 118 to accommodate for the distortion condition indicated. It is noted that signal conditioning circuitry 214 may analyze the signal information for additional distortion effects, as desired, and that suitable signals may be provided to the stereo decoder through indication signals 215 so that accommodations may be made for such additional distortion effects. It is further noted that the signals 215, including the blank signal (BLANK) 312 and the switch signal (SWITCH) 316, may be asserted when at a high logic level or when at a low logic level, depending upon the design chosen as desired.

Figure 5:
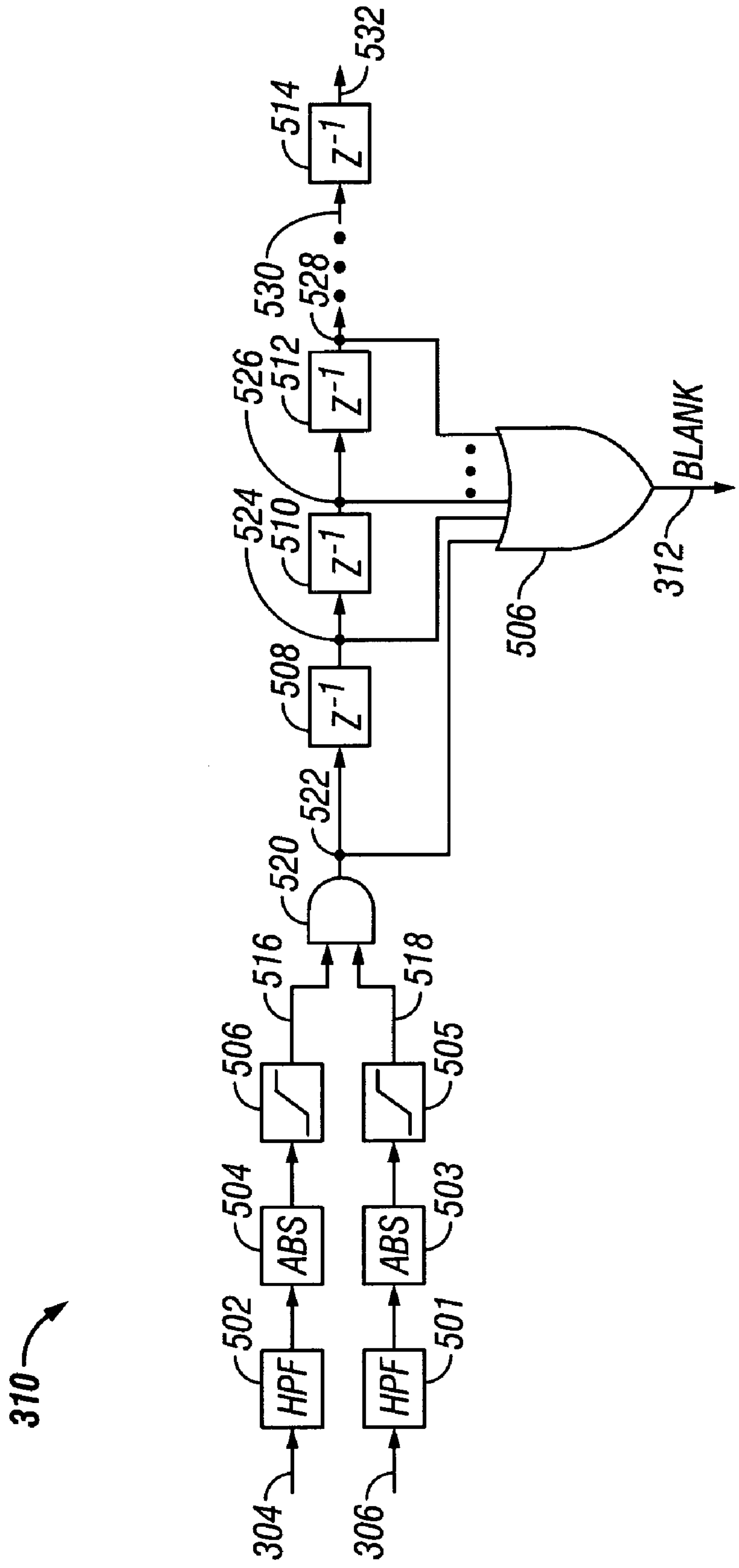
FIG. 5 is a block diagram of an embodiment for impulse noise discrimination circuitry according to the present invention.

FIG. 5 is a block diagram of impulse noise discrimination circuitry 310. The magnitude signal (mag) 304 is filtered by a high pass filter (HPF) 502 to isolate the high-frequency noise produced by an impulse event. This filtered signal is passed through absolute value (ABS) circuitry 504 to obtain a quantitative value for any high-frequency noise remaining in the signal. Detection circuitry 506 determines whether the signal is above a selected threshold level. If so, the threshold detection circuitry 506 outputs a high logic level on signal 516, indicating that a high-frequency noise event has been detected on the magnitude signal (mag) 304. Similarly, the multiplexed signal (mpx) 306 is filtered by a high pass filter (HPF) 501 to isolate the high-frequency noise produced by an impulse event. This filtered signal is passed through absolute value (ABS) circuitry 503 to obtain a quantitative value for any high-frequency noise remaining in the signal. Detection circuitry 505 determines whether the signal is above a selected threshold level. If so, the threshold detection circuitry 505 outputs a high logic level on signal 518, indicating that a high-frequency noise event has been detected on the multiplexed signal (mpx) 306. The signals 516 and 518 may both stay high for some desired amount of time after an event has been detected above the threshold levels. The signal 516 and 518 are then both fed into an AND gate 520, so that the output signal 522 of the AND gate 520 will be at a high logic level when both signals 516 and 518 are at a high logic level.

An impulse noise distortion event will tend to create an impulse in amplitude, phase, and multiplex output at the output of the CORDIC AM/FM demodulator 210. Impulse noise is typically broadband in nature, producing significant energy above 100 kHz. Conversely, the magnitude (mag) 304 is very low frequency in nature, varying only at the rate of multipath distortions, which are typically below 50 Hz for broadcast FM in a moving automobile. Also, the multiplex (mpx) signal 306 contains mainly lower-frequency energy well below 100 kHz, as shown in FIG. 4. Thus, an indication of an impulse noise event for both the magnitude (mag) signal 304 and the multiplex (mpx) signal 306 is the occurrence of energy above 100 kHz. To detect this energy, the high-pass filters (HPF) 301 and 302 may be designed to have a cut-off frequency at about 100 kHz. It is noted that the threshold levels for threshold detection circuitry 505 and 506 may be a programmable value and may be selected as desired. It is further noted that the high-pass filter 502 for the magnitude (mag) signal 304 may have a cutoff frequency well below 100 kHz (down to 100 Hz) if desired.

Both the magnitude signal (mag) 304 and the multiplexed signal (mpx) 306 are analyzed to reduce false detection of impulse noise events. If only the multiplexed signal (mpx) 306 were monitored, other sources could trigger a false indication of an impulse noise distortion event. For example, a weak signal may cause FM thresholding that may cause broadband impulse noise above 100 kHz at the output of demodulator 210. In addition, adjacent channel interferers may produce significant energy above 100 kHz. These non-impulse noise events may be falsely interpreted as impulse noise distortion events if only one of the signals were monitored. In contrast, if there is a sudden impulse in the magnitude signal (mag) 304 simultaneously with a sudden impulse in the multiplexed signal (mpx) 306, the impulse in the multiplexed signal (mpx) 306 will very likely be from impulse noise and not from a non-impulse noise event, such as weak field conditions or interferers. Thus, according to the present invention, both signals are monitored to produce the impulse event indication signal 522.

When the impulse event indication signal 522 is at a high logic level, impulse noise distortion is concluded to exist within the signal. Because signal 522 may jump between high and low logic levels during an impulse noise distortion event, a series of delay circuits ($Z^{-1}$) 508, 510, 512 . . . 514 may be used in conjunction with an OR gate 506 to smooth out the resulting blank signal (BLANK) 312. As shown in FIG. 5, any desired number of delay circuits may be used. The signal 524 is delayed with respect to the signal 522. The signal 526 is delayed with respect to the signal 524. The signal 528 is delayed with respect to the signal 526, and so on with the last signal 532 being delayed with respect to the next to last signal 530. The initial signal 522 and each of the delayed output signals 524, 526, 528, . . . 530, 532 are fed to the OR gate 506. If any of these signals are at a high logic level, the OR gate 506 will produce a high logic level on blank signal (BLANK) 312. By utilizing the series of delay circuits ($Z^{-1}$) 508, 510, 512 . . . 514 and the OR gate 506, the signal 522, which may jump around between logic levels, is smoothed out into a blank signal (BLANK) 312 that tends not to change until after the distortion event has passed.

Depending upon the conditions expected to be encountered by the radio receiver 150, it may be desirable to set a maximum amount of time that the blank signal (BLANK) 312 may remain high. This maximum time amount will tend to prevent complete muting of the audio signals under extreme impulse noise conditions. Also, it may be desirable to set a minimum amount of time before which the next signal blanking may occur. This minimum time amount will tend to prevent blanking of the audio signal in closely repeated events.

Figure 6:
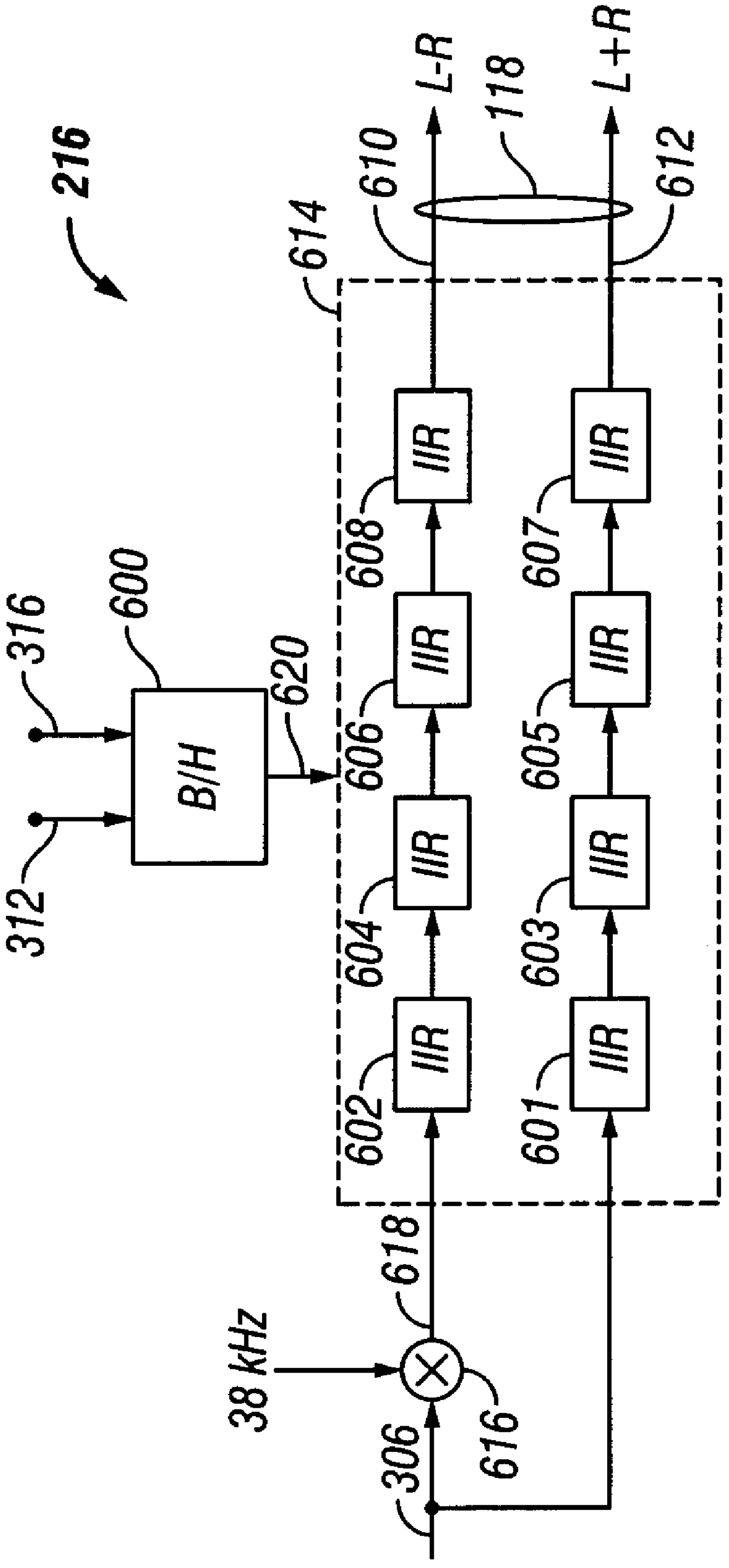
FIG. 6 is a block diagram of an embodiment for a stereo decoder receiving distortion event signals from the impulse noise discrimination circuitry and the multipath discrimination circuitry.

FIG. 6 is a block diagram of an embodiment for stereo decoder 216. The stereo decoder 216 receives the multiplexed signal (mpx) 306 and produces an audio output signal 118 that includes the left-minus-right (L–R) audio signal 610 and the left-plus-right (L+R) audio signal 612. The multiplexed signal (mpx) 306 includes the left-minus-right (L–R) signal 406, which is centered at about 38 kHz, and the left-plus-right (L+R) signal 402, which is centered at about 0 kHz. The multiplexed signal (mpx) 306 is fed into filter circuitry 614 through IIR filters 601, 603, 605 and 607 to isolate the left-plus-right (L+R) audio signal 612. To isolate left-minus-right (L–R) audio signal 610, the multiplexed signal (mpx) 306 is first mixed with a 38 kHz tone by mixer 616 to form signal 618, which includes the left-minus-right (L–R) signal 406 moved down to DC (i.e., 0 kHz). The signal 618 is then fed into filter circuitry 614 through IIR filters 602, 604, 606 and 608 to isolate the left-plus-right (L+R) audio signal 612. It is noted that the IIR filters 601, 602, 603, 604, 605, 606, 607, and 608 within filter circuitry 614 may be low-pass filters with a 15 kHz cut-off frequency and may have programmable coefficients so that the filter response may be programmably modified. It is also noted that the type and number of filters used for filter circuitry 614 may be chosen as desired to isolate the audio output signals 610 and 612.

Blank and hold circuitry (B/H) 600 may be utilized to control the audio output signal 118 through control signals 620. For example, when the blank signal (BLANK) 312 indicates that a impulse noise distortion event has occurred, the blank and hold circuitry (B/H) 600 may respond by holding the audio signal at its current value and by blanking the portion of the audio signal including the impulse noise distortion. The blank and hold circuitry (B/H) 600 may respond in a similar way when it receives other distortion indication signals, such as the switch signal (SWITCH) 316. More particularly, in operation of the embodiment depicted in FIG. 6, blank and hold circuitry (B/H) 600 may act to hold the output of the first IIR filters 601 and 602 and to reset their state variables to zero until the blank signal (BLANK) 312 goes low. Thus, while the blank signal (BLANK) 312 is at a high logic level, the outputs of the first IIR filters 601 and 602 are held at the value immediately before the blank signal (BLANK) 312 went high. When the blank signal (BLANK) transitions back to a low logic level, the first IIR filters 601 and 602 are returned to their normal operation.

Figure 7:
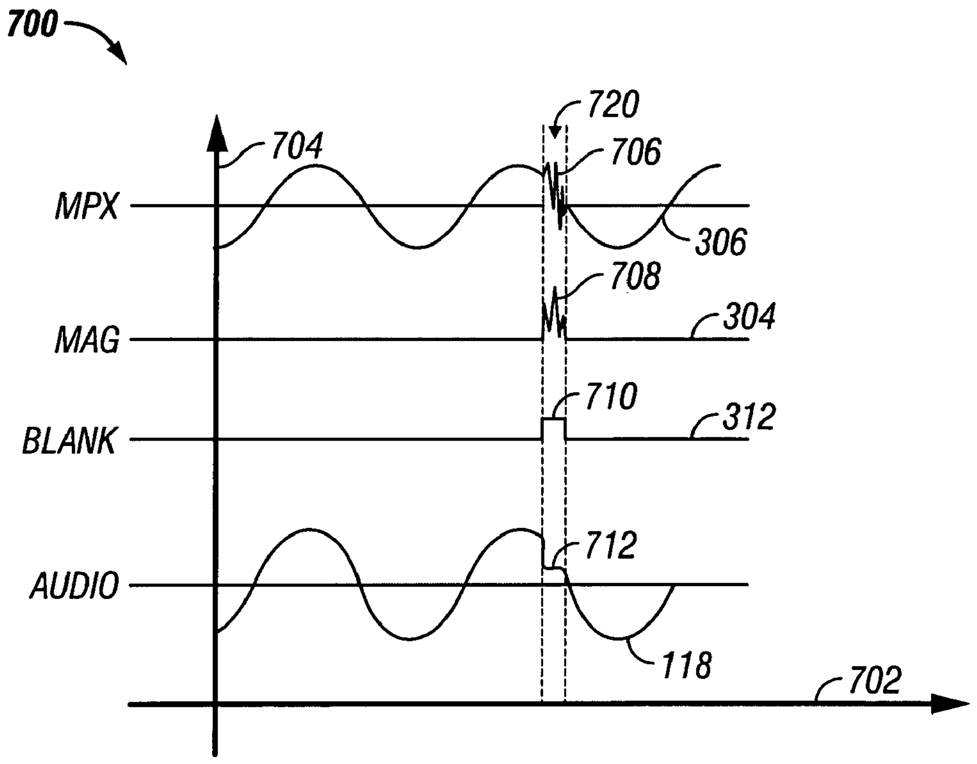
FIG. 7 is a signal diagram of example waveforms for an impulse noise distortion event.

FIG. 7 is a signal diagram of example waveforms 700 for an impulse noise distortion event. The x-axis 702 represents time, and the y-axis 704 represents magnitude. The multiplexed signal (mpx) 306 includes impulse noise distortion 706 within a time window 720 represented by the dotted lines in FIG. 7. The impulse noise distortion 706 is seen as a distortion in the sinusoidal waveform, which represents the ideal output for the multiplexed signal (mpx) 306. It is noted that this waveform is intended only to be a graphical representation and that the multiplexed signal (mpx) 306 is digital information in the embodiments previously discussed.

Still referring to FIG. 7, the magnitude signal (mag) 304 will be about constant for a relatively ideal sinusoidal waveform depicted for the multiplexed signal (mpx) 306. However, within the time window 720, the impulse noise distortion event 706 has caused spikes in the magnitude signal (mag) 304. The impulse noise detection circuitry 310, as discussed with respect to FIG. 5, analyzes the multiplexed signal (mpx) 306 and the magnitude signal (mag) 304 and determines that an impulse noise distortion event has occurred. The output signal 522 in FIG. 5, therefore, will become a series of logic level transitions. These transitions are smoothed out by the series of delay circuits in FIG. 5 to generate the blanking signal (BLANK) 312 with a smooth pulse 710 within the signal. As depicted in FIG. 7, this pulse 710 within the blanking signal (BLANK) 312 will transition from a low logic level to a high logic level at the beginning of time window 720 and will then transition back at the end of the time window 720.

As discussed above, the blanking signal (BLANK) 312 with pulse 710 is fed to the blank and hold (B/H) circuitry 600 in FIG. 6. The audio signal 118 in FIG. 7 provides a graphical representation of the effect that the blank and hold (B/H) circuitry 600 has on the audio signal 118. The level of the audio signal 118 at the beginning of the time window 720 is held as indicated by the flat line 712. At the end of the time window 720, the audio signal 118 proceeds to follow the desired sinusoidal shape for the audio signal 118. It is again noted that this waveform is intended only to be a graphical representation and that the audio signals 118, including the left-plus-right (L+R) audio signal 612 and the left-minus-right (L−R) audio signal 610, are digital information in the embodiments depicted above.

In addition to the impulse noise distortion events discussed above, other distortion events may also be discriminated by utilizing the signal outputs from the CORDIC AM/FM demodulator 210. One of these other distortion events are multipath distortion events. As with impulse noise distortion events, once a multipath distortion has been detected, the audio output signals 118 may be adjusted accordingly to accommodate the distortion. In addition, for a multipath distortion event, the radio receiver 150 may switch to an alternate antenna. For example, an automobile may have two antennas with one located at the front of the automobile and the other located at the back of the automobile. By switching antennas, the radio receiver may eliminate the multipath distortion by altering the distance of the signal paths being traveled.

Figure 8:
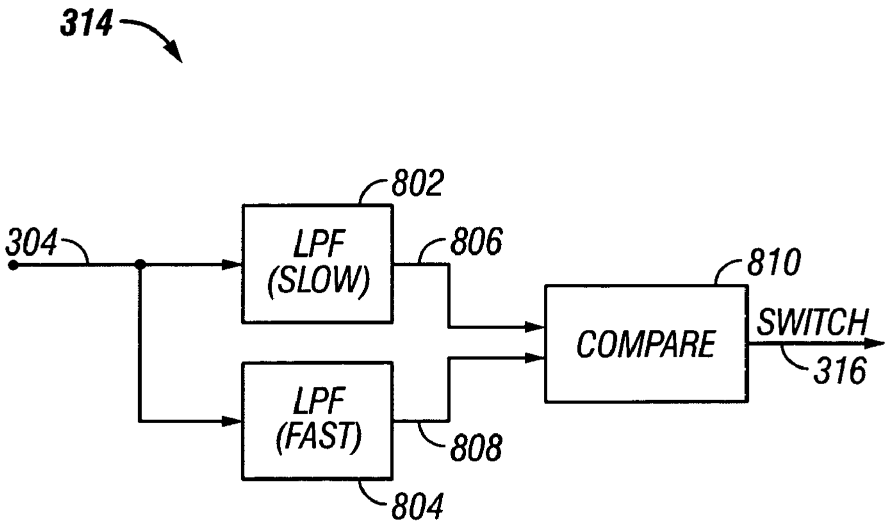
FIG. 8 is a block diagram of an embodiment for multipath distortion discrimination circuitry according to the present invention.

FIG. 8 is a block diagram of an embodiment for multipath distortion discrimination circuitry 314. The multipath distortion discrimination circuitry 314 analyzes the magnitude signal (mag) 304 to determine if a multipath distortion exists in the received signal. If so, multipath distortion detection circuitry 314 produces an appropriate switch signal (SWITCH) 316 indicating that the radio receiver should switch antennas and take appropriate action to alleviate audio signal quality degradation due to the distortion.

The multipath distortion discrimination circuitry 314 makes a determination of a multipath distortion exists by comparing the level of the magnitude signal (mag) 304 with a moving-average version of that same signal. To accomplish this comparison, the low-pass filter (LPF) 802 has a much slower time constant than low-pass filter 804, and thus the output 806 of low-pass filter (LPF) 802 will change more slowly compared to the output 808 of low-pass filter (LPF) 804. The fast output 808 will more accurately track rapid changes in the magnitude (mag) signal 304 caused by multipath distortions, and the slow output 806 will more accurately reflect the average magnitude (mag) signal 304 level at a particular time. The compare circuitry 810 determines whether or not the slow signal 806 and the fast signal 808 vary by more than a desired amount. For example, if the two signals 806 and 808 vary by more than 10 dB, the compare circuitry 810 may conclude that a multipath distortion event has occurred, and an appropriate signal level change may then be asserted on switch signal (SWITCH) 316. As described above, switch signal (SWITCH) 316 may be applied to the blank and hold (B/H) circuitry 600 in FIG. 6 to control the audio output signals 118 during a multipath distortion event. It is noted the signal comparison may be accomplished in any manner desired and that the threshold difference level may be adjusted as desired.

By monitoring both the fast signal 808 and the slow signal 806, the compare circuitry 810 is able to accurately and efficiently discriminate multipath noise distortion events. If the fast output signal 808 from low-pass filter (LPF) 804 suddenly drops below the slow output signal 806 from low-pass filter (LPF) 802, the compare circuitry 810 may conclude that a multipath distortion event has occurred. If the radio receiver 150 has two antennas, a switch may be made from one antenna to the other. When an antenna switch is made, the audio output signals 118 may also be held by stereo decoder 216 for a few samples to suppress the disturbance caused by the switch. It is noted that the time constants for the low-pass filters (LPFs) 802 and 804 may be adjusted as desired. For example, the slow low-pass filter (LPF) 802 may have a longer time constant of about one second, and the fast low-pass filter (LPF) 804 may have a shorter time constant of about one millisecond.

Figure 9:
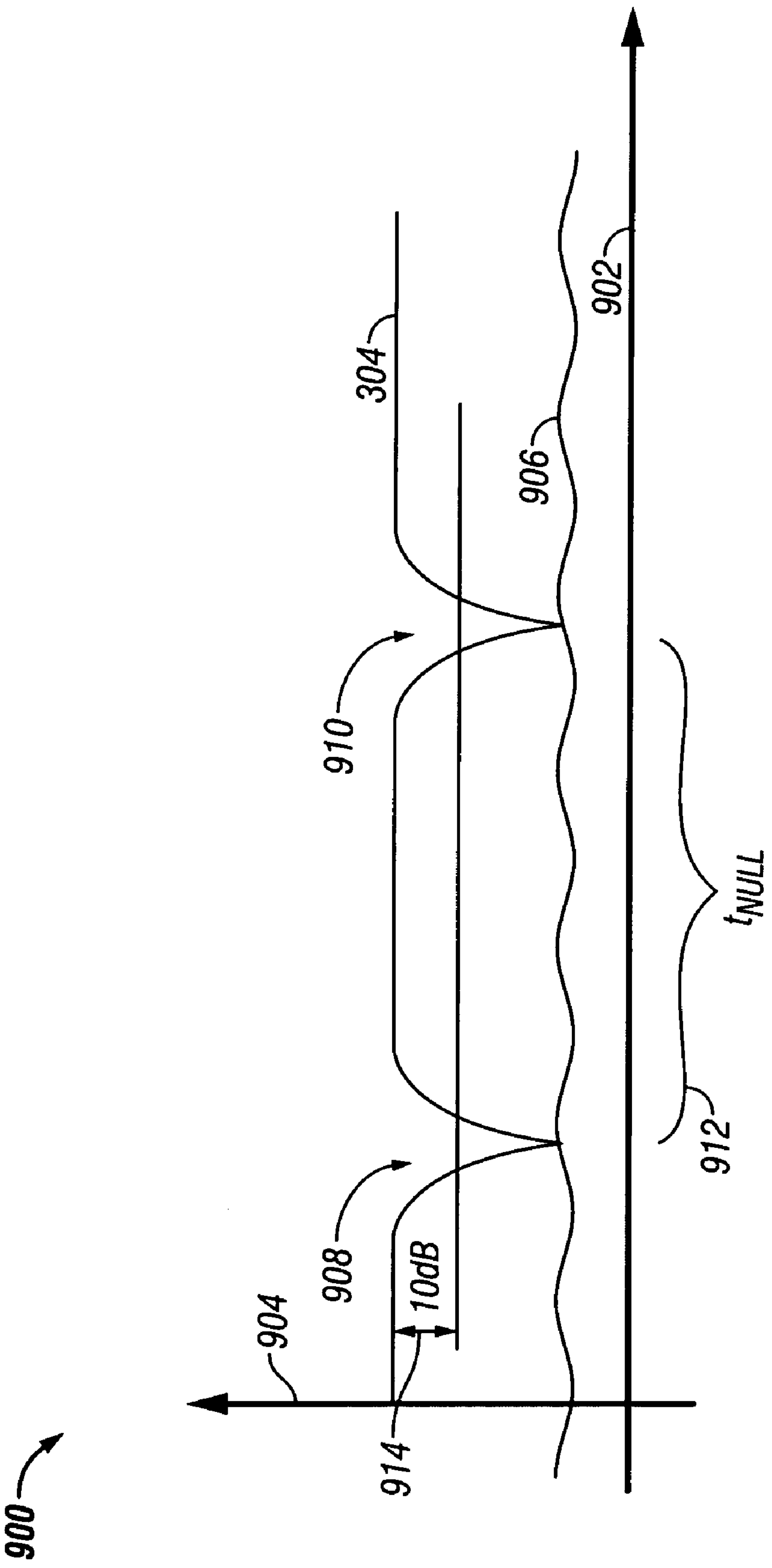
FIG. 9 is a signal diagram of an example waveform for an multipath distortion event.

FIG. 9 is a signal diagram of an example waveform 900 for a multipath distortion event. The x-axis 902 represents time, and the y-axis 904 represents magnitude. As discussed with respect to FIG. 7, the magnitude level for magnitude signal (mag) 304 will remain about constant if the audio signal is not experiencing distortion. The downward spikes for the magnitude signal (mag) 304 at areas 908 and 910 represent null areas in which multipath distortions have occurred. The line 906 represents the noise level for the system. When the magnitude signal (mag) 304 falls to the level of the noise 906, a multipath disturbance will occur at the FM demodulator output. The dotted line 914 represents a magnitude threshold level at which the compare circuitry 810 of FIG. 8 will conclude that a multipath distortion event is about to occur. As depicted in FIG. 9, this magnitude threshold level is a 10 dB drop from the normal (running average) magnitude level for magnitude signal (mag) 304. Thus, when the magnitude level (mag) 304 falls below this threshold line 914, the compare circuitry 810 will assert the switch signal (SWITCH) 316 to indicate that a multipath distortion event has occurred. The switch signal (SWITCH) 316 may be asserted as a pulsed signal, and a selected or programmable wait period may be allowed to pass before the switch signal (SWITCH) 316 can be asserted again. As discussed above with respect to FIG. 6, the blank and hold (B/H) circuitry 600 may utilize this switch signal (SWITCH) 316 to control the audio signal output 118. This signal may also be used by the radio receiver 150 to switch antennas.

The time period ($t_{NULL}$) 912 between null areas 908 and 910 represents a possible periodic time of occurrence between multipath distortion events. For example, with an automobile traveling approximately 100 km/hr, multipath distortion null areas may tend to occur at a frequency of once every 1/38 of a second. One limitation that may be placed on the switching of antennas is that this switching not occur any faster than the expected time ($t_{NULL}$) 912 between successive null areas 908 and 910. Thus, for example, with the 100 km/hr example, a switch indication within 1/38 of a second of the last switch would not be implemented by the system.

What is claimed is:

1. A radio receiver for processing audio information and discriminating distortions within the processed signals, comprising:

analog to digital converter circuitry;

demodulator circuitry coupled to receive digital signals from the analog to digital converter circuitry and having demodulated digital signals as outputs; and distortion discrimination circuitry coupled to the demodulated digital signals and having at least one distortion indication signal as an output, the distortion indication signal indicating when a distortion event has been detected; and wherein the distortion discrimination circuitry comprises impulse noise distortion discrimination circuitry and the distortion indication signal comprises an impulse noise distortion indication signal; and wherein the impulse noise discrimination circuitry monitors a digital magnitude signal and a digital multiplexed signal from the demodulator to determine the existence of an impulse noise event.

2. The radio receiver of claim 1, wherein the demodulator is a CORDIC demodulator.

3. The radio receiver of claim 1, wherein the impulse noise discrimination circuitry comprises:

a first threshold detection circuit coupled to receive the digital magnitude signal from the demodulator and having an output signal that is asserted when a threshold is exceeded; and a second threshold detection circuit coupled to receive the digital multiplexed signal from the demodulator and having an output signal that is asserted when a threshold is exceeded; and wherein a distortion event signal is asserted when both the output signals from the first and second threshold detection circuits are simultaneously asserted.

4. The radio receiver of claim 3, wherein the first and second threshold detection circuits each comprise a high-pass filter and a threshold comparator.

5. The radio receiver of claim 4, wherein the high-pass filters have cut-off frequencies at about 100 kHz.

6. The radio receiver of claim 3, further comprising smoothing circuitry coupled to receive the distortion event signal and to produce an impulse output signal to act as the impulse noise distortion indication signal.

7. A radio receiver for processing audio information and discriminating distortions within the processed signals, comprising:

analog to digital converter circuitry;

Cordic demodulator circuitry coupled to receive digital signals from the analog to digital converter circuitry and having demodulated digital signals as outputs;

distortion discrimination circuitry coupled to the demodulated digital signals and having at least one distortion indication signal as an output, the distortion indication signal indicating when a distortion event has been detected; and a stereo decoder coupled to receive the impulse noise distortion indication signal, wherein the stereo decoder is responsive to the impulse noise distortion indication signal to modify the audio output signals to diminish impulse noise distortion effects in the decoded audio output signals; and wherein the stereo decoder modifies the audio output signals by performing a blank and hold procedure.

8. A radio receiver for processing audio information and discriminating distortions within the processed signals, comprising:

analog to digital converter circuitry;

Cordic demodulator circuitry coupled to receive digital signals from the analog to digital converter circuitry and having demodulated digital signals as outputs; and distortion discrimination circuitry coupled to the demodulated digital signals and having at least one distortion indication signal as an output, the distortion indication signal indicating when a distortion event has been detected; and wherein the distortion discrimination circuitry comprises multipath distortion discrimination circuitry and the distortion indication signal comprises a multipath distortion indication signal; and wherein the multipath discrimination circuitry monitors a magnitude signal from the demodulator to determine the existence of an impulse noise event.

9. The radio receiver of claim 8, wherein the multipath discrimination circuitry comprises:

a first low-pass filter having a first time constant and being coupled to receive the digital magnitude signal from the demodulator;

a second low-pass filter having a second time constant and being coupled to receive the digital magnitude signal from the demodulator, the second time constant being longer than the first time constant; and compare circuitry coupled to receive output signals from the first and second low-pass filters and having the multipath distortion indication signal as an output, the multipath distortion indication signal being asserted if the output signals from the first and second low-pass filters differ in signal strength by more than a selected amount.

10. The automobile radio receiver of claim 8, further comprising a stereo decoder coupled to receive the multipath distortion indication signal, wherein the stereo decoder is responsive to the multipath distortion indication signal to modify the audio output signals to diminish distortion effects in the decoded audio output signals.

11. The radio receiver of claim 10, wherein the stereo decoder modifies the audio output signals by performing a blank and hold procedure.

12. A method for discriminating distortion events within digital receivers, comprising:

converting analog audio information to digital audio signal information;

demodulating the digital audio signal information;

discriminating distortions within the demodulated digital signals by monitoring the demodulated digital signals; and generating at least one distortion indication signal a distortion event has been detected within the demodulated digital signals; and wherein the discriminating distortions step comprises discriminating impulse noise distortion events and wherein the generating step comprises generating an impulse noise distortion indication signal; and wherein the discriminating step comprises monitoring a digital magnitude signal and a digital multiplexed signal from the demodulator.

13. The method of claim 12, wherein the discriminating step further comprises:

asserting a first output signal if the digital magnitude signal from the demodulator exceeds a first threshold level;

asserting a second output signal if the digital multiplexed signal from the demodulator exceeds a second threshold level; and asserting a distortion event signal when both the first and second output signals are simultaneously asserted.

14. The method of claim 13, wherein the first two asserting steps include filtering the digital magnitude signal and the digital multiplexed signal with high-pass filters having cut-off frequencies at about 100 kHz.

15. The method of claim 13, further comprising generating the impulse noise distortion indication signal by smoothing the distortion event signal.

16. The method of claim 12, further comprising modifying the audio output signals in response to the impulse noise distortion indication signal to diminish impulse noise distortion effects in the audio output signals.

17. A method for discriminating distortion events within digital receivers, comprising:

converting analog audio information to digital audio signal information;

Cordic demodulating the digital audio signal information;

discriminating distortions within the demodulated digital signals by monitoring the demodulated digital signals; and generating at least one distortion indication signal a distortion event has been detected within the demodulated digital signals; and wherein the discriminating distortion step comprises discriminating multipath distortion events and wherein the generating step comprises generating a multipath distortion indication signal; and wherein the discriminating step comprises monitoring a magnitude signal from the demodulator.

18. The method of claim 17, wherein the discriminating step further comprises:

filtering the digital magnitude signal from the demodulator with a first filter having a first time constant;

filtering the digital magnitude signal from the demodulator with a second filter having a second time constant, the second time constant being longer than the first time constant;

comparing the output signals from the first and second filters; and asserting the multipath distortion indication signal if the output signals from the first and second filters differ in signal strength by more than a selected amount.

19. The method of claim 17, further comprising modifying the audio output signals in response to the impulse noise distortion indication signal to diminish impulse noise distortion effects in the audio output signals.

20. Distortion discrimination circuitry for a radio receiver, comprising:

demodulated digital audio input signals; and at least one distortion indication signal as an output, the distortion indication output signal indicating when a distortion event has been detected in the demodulated audio input signals; and wherein the distortion discrimination circuitry comprises impulse noise distortion discrimination circuitry and the distortion indication signal comprises an impulse noise distortion indication signal; and wherein the demodulated digital audio input signals comprise a digital magnitude signal and a digital multiplexed signal from a demodulator and the impulse noise distortion indication signal is based upon monitoring these two signals to determine the existence of an impulse noise event.

21. The distortion discrimination circuitry of claim 20, further comprising:

a first threshold detection circuit coupled to receive the digital magnitude signal from the demodulator and having an output signal that is asserted when a threshold is exceeded; and a second threshold detection circuit coupled to receive the digital multiplexed signal from the demodulator and having an output signal that is asserted when a threshold is exceeded; and wherein a distortion event signal is asserted when both the output signals from the first and second threshold detection circuits are simultaneously asserted.

22. The distortion discrimination circuitry of claim 21, wherein the first and second threshold detection circuits each comprise a high-pass filter and a threshold comparator.

23. The distortion discrimination circuitry of claim 21, further comprising smoothing circuitry coupled to receive the distortion event signal and to produce an impulse output signal to act as the impulse noise distortion indication signal.

24. The distortion discrimination circuitry of claim 20, wherein the distortion discrimination circuitry comprises multipath distortion discrimination circuitry and the distortion indication signal comprises a multipath distortion indication signal.

25. The distortion discrimination circuitry of claim 24, wherein the demodulated digital audio input signals comprise a magnitude signal from the demodulator and the multipath distortion indication signal is based upon monitoring this signal to determine the existence of an impulse noise event.

26. The distortion discrimination circuitry of claim 25, further comprising:

a first low-pass filter having a first time constant and being coupled to receive the digital magnitude signal from the demodulator;

a second low-pass filter having a second time constant and being coupled to receive the digital magnitude signal from the demodulator, the second time constant being longer than the first time constant; and compare circuitry coupled to receive output signals from the first and second low-pass filters and having the multipath distortion indication signal as an output, the multipath distortion indication signal being asserted if the output signals from the first and second low-pass filters differ in signal strength by more than a selected amount.

* * * * *